US011642192B1

(12) United States Patent
Alenezi et al.

(10) Patent No.: US 11,642,192 B1
(45) Date of Patent: May 9, 2023

(54) TOOL FOR EXTRACTING BROKEN ENDODONTIC INSTRUMENT

(71) Applicant: GIIFTEDNESS AND CREATIVITY COMPANY, Safat (KW)

(72) Inventors: Mohammad A A H H Alenezi, Safat (KW); Mohammad A M T Alenezi, Safat (KW); Intesar H Alshehaima, Safat (KW)

(73) Assignee: GIFTEDNESS AND CREATIVITY COMPANY, Safat (KW)

( * ) Notice: Subject to any disclaimer, the term of this patent is extended or adjusted under 35 U.S.C. 154(b) by 0 days.

(21) Appl. No.: 17/963,026

(22) Filed: Oct. 10, 2022

(51) Int. Cl.
*A61C 5/46* (2017.01)
*A61C 5/55* (2017.01)

(52) U.S. Cl.
CPC . *A61C 5/46* (2017.02); *A61C 5/55* (2017.02)

(58) Field of Classification Search
CPC .... A61C 5/40; A61C 5/46; A61C 5/48; A61C 5/55; A61C 5/50; A61C 5/62; A61C 13/20; A61C 3/02
See application file for complete search history.

(56) References Cited

U.S. PATENT DOCUMENTS

| 3,322,124 A | * | 5/1967 | Ireland | A61B 17/50 D24/114 |
| 4,746,292 A | * | 5/1988 | Johnson | A61C 5/46 294/212 |
| 6,227,855 B1 | | 5/2001 | Hickok et al. | |
| 7,367,804 B2 | | 5/2008 | Lewis | |
| 7,677,892 B2 | * | 3/2010 | Aleksandrovskiy | A61C 5/46 433/32 |
| 9,248,006 B2 | | 2/2016 | Aleksandrovskiy | |
| 9,579,166 B2 | | 2/2017 | Lasner | |
| 9,848,963 B2 | * | 12/2017 | Munce | A61C 8/0089 |

(Continued)

FOREIGN PATENT DOCUMENTS

| DE | 683144 | * 10/1939 |
| DE | 3708561 | * 9/1988 |
| WO | 9962420 A1 | 12/1999 |

OTHER PUBLICATIONS

Cvikl et al "Removal of Fractured endodontic Instruments using an Nd:YAG laser" Quintessence Int. Jul.-Aug. 2014: 45(7):569-75 (Year: 2014).*

(Continued)

*Primary Examiner* — Edward Moran
(74) *Attorney, Agent, or Firm* — Nath, Goldberg & Meyer; Richard C. Litman

(57) ABSTRACT

The tool for extracting broken endodontic instrument has a cylindrical, tubular body. The body has a cap at one end and a conical nose at the opposite end. A gripper tube for gripping a broken endodontic file extends from the conical nose. The body of the tool houses a heating or soldering device equipped with a magazine of balls of solder. The gripper tube has an open tip dimensioned for slidably receiving an end of the broken file and resilient gripper prongs inside the tube allowing insertion of the end of the file but preventing the file from exiting the gripper tube. The heating device may be turned on to melt a ball of solder to solder the gripper prongs to the broken file to further secure the broken file to the gripper tube for extraction of the broken endodontic tube from the root canal.

17 Claims, 9 Drawing Sheets

(56) References Cited

U.S. PATENT DOCUMENTS

| | | | |
|---|---|---|---|
| 10,813,719 B1 | 10/2020 | Radwan | |
| 2004/0142302 A1* | 7/2004 | Aeby | A61C 5/46 433/141 |
| 2009/0176189 A1* | 7/2009 | Hof | A61C 5/46 433/141 |

OTHER PUBLICATIONS

Inamoto, Takeshi, "Picking Up a Separated Fite With Magnetic Force", International ournal of MicroDentistry(2018), vol. 9, No. 1, pp. 28-33.

Heydarl et al., "Removal of a Broken Instrument from a Tooth with Apical Periodontitis Using a Novel Approach", Iranian Endodontic Journal, (2016), vol. 11, No. 3, p. 237-240.

* cited by examiner

TOOL FOR EXTRACTING BROKEN ENDODONTIC INSTRUMENT

BACKGROUND

1. Field

The disclosure of the present patent application relates dental instruments, and particularly to a tool for extracting broken endodontic instrument that may be used, for example, to remove a file broken or separated during a root canal procedure from a patient's dental root.

2. Description of the Related Art

Practitioners in the field of dentistry are sometimes called upon to treat a patient having a cracked or broken tooth. The crack or break may be severe enough that it exposes the pulp inside the tooth to infection and inflammation, and if left untreated, may result in gum disease. In any event, the patient often experiences pain and discomfort, sensitivity when ingesting hot or cold food or beverages, and other symptomatic complaints. Typically, the treatment of choice is a root canal procedure, which is usually performed by an endodontist, followed by installation of a crown or other dental restoration by a dentist to provide some form of permanent protection against future infection or re-inflammation.

In a root canal procedure, an access hole is created in the crown using a drill. The pulp is removed and the canal is cleaned and disinfected down to the roots using tiny files and appropriate cleaning fluids and disinfectants. The canal is filled with gutta percha and a temporary filling may be used to cap the tooth. Afterward, a dentist will install a crown or perform other dental restoration to protect the tooth.

The tiny files used to remove the pulp are made from a nickel-titanium alloy or from stainless steel. Due to the length, width, curvature, and sometimes ledges of dentin form in the canal, some root canals may be very tough to clean. If too much pressure is exerted or if the files or other small instruments are used too many times or for too long a period, the files or other instruments may fracture and separate, leaving a small piece in the canal. In some cases, the separated instrument may be left in the canal or easily removed, but if the broken piece prevents removal of the pulp or obstructs the canal, preventing proper cleaning and disinfection, it may be necessary to resort to some form of tool or instrument to extract or remove the piece of the broken or separated instrument. Thus, a tool for extracting broken endodontic instrument solving the aforementioned problems is desired.

SUMMARY

The tool for extracting broken endodontic instrument has a cylindrical, tubular body. The body has a cap at one end, the cap having a button switch at one end and a conical nose at the opposite end. A gripper tube adapted for gripping a broken endodontic file extends from the conical nose. The body of the tool houses a battery power supply and a heating or soldering device equipped with a magazine of balls of solder. The gripper tube has an open tip dimensioned for slidably receiving an end of the broken file and resilient gripper prongs inside the tube allowing insertion of the end of the file but preventing the file from exiting the gripper tube. The heating device may be turned on to melt a ball of solder, which drains into the gripper tube to solder the gripper prongs to the broken file to further secure the broken file to the gripper tube for extraction of the broken endodontic tube from the root canal.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The tool for extracting broken endodontic instrument has a cylindrical, tubular body. The body has a cap at one end, the cap having a button switch at one end and a conical nose at the opposite end. A gripper tube adapted for gripping a broken endodontic file extends from the conical nose. The body of the tool houses a battery power supply and a heating or soldering device equipped with a magazine of balls of solder. The gripper tube has an open tip dimensioned for slidably receiving an end of the broken file and resilient gripper prongs inside the tube allowing insertion of the end of the file but preventing the file from exiting the gripper tube. The heating device may be turned on to melt a ball of solder, which drains into the gripper tube to solder the gripper prongs to the broken file to further secure the broken file to the gripper tube for extraction of the broken endodontic tube from the root canal.

Figure 1:
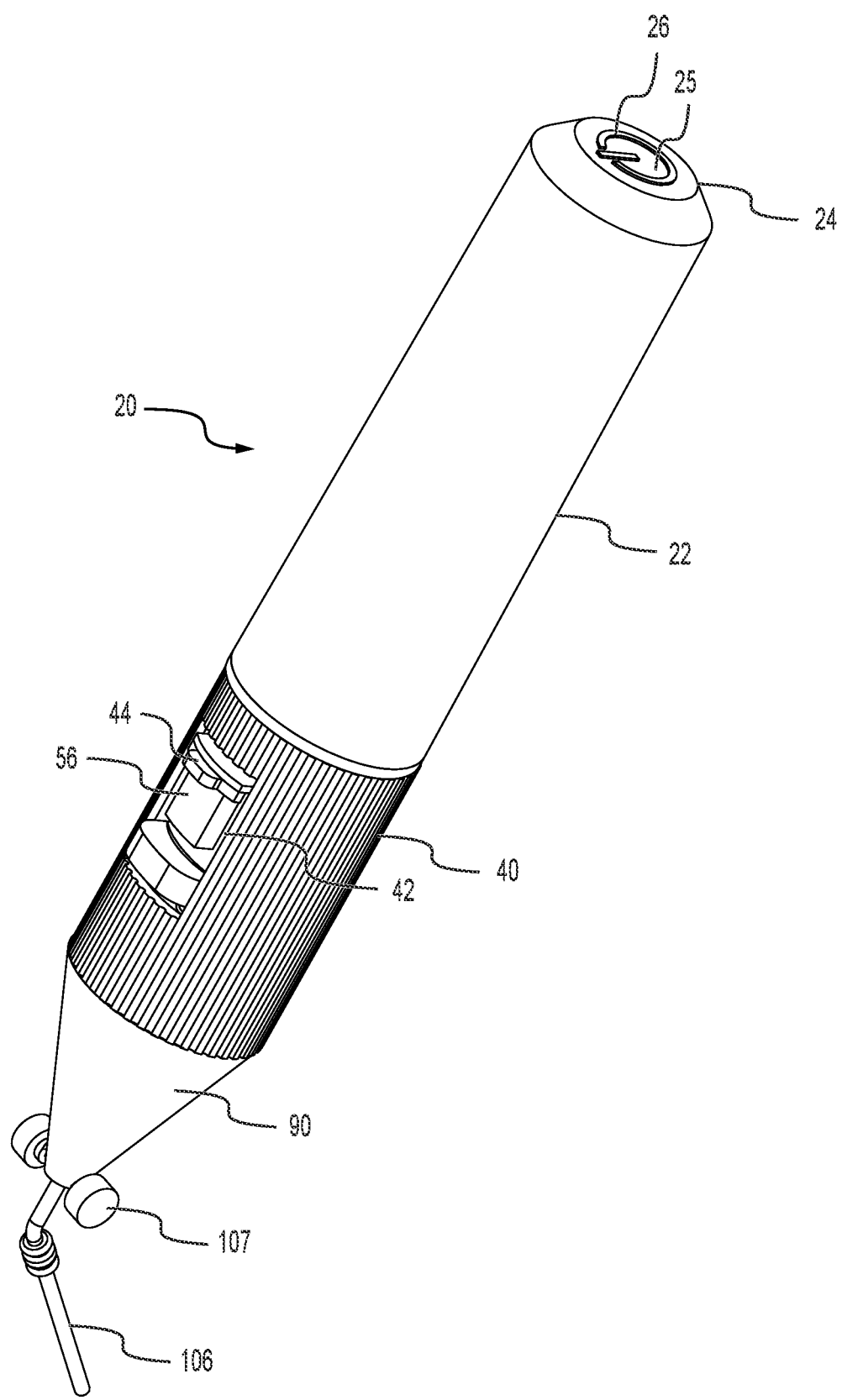
FIG. 1 is a perspective view of a tool for extracting broken endodontic instrument.
Figure 2:
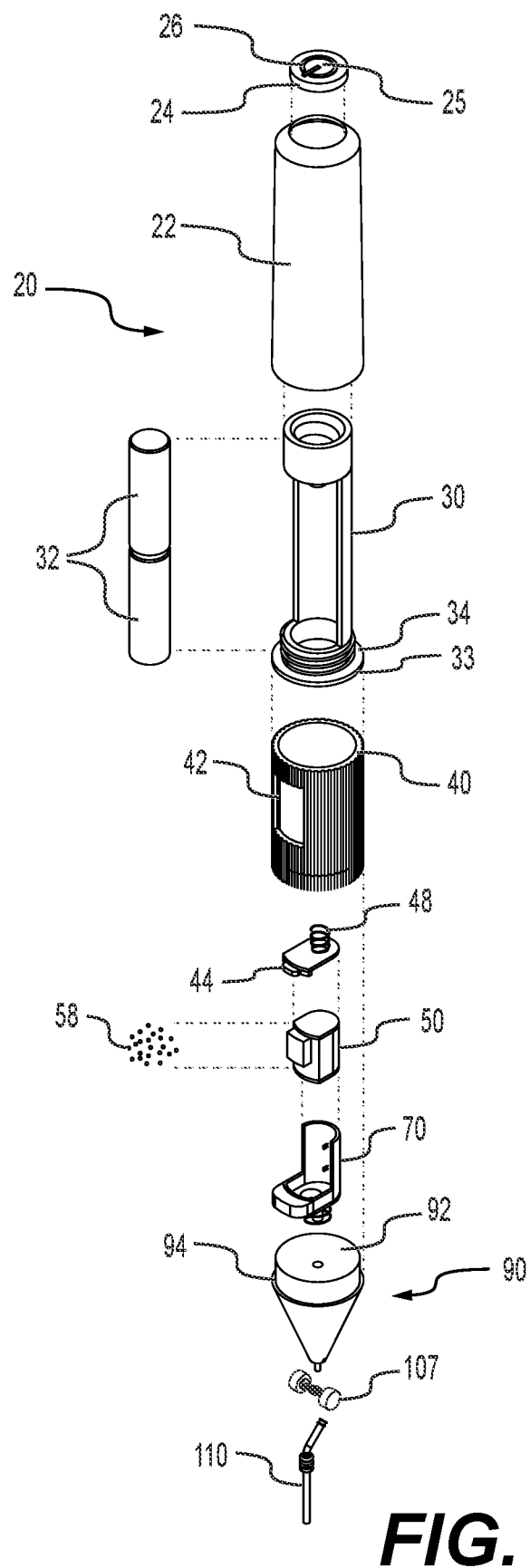
FIG. 2 is an exploded perspective view in of the tool for extracting broken endodontic instrument of FIG. 1.
Figure 3:
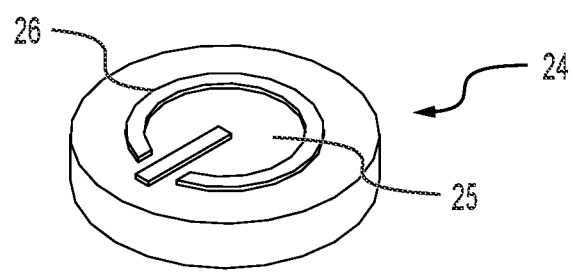
FIG. 3 is a perspective view of an end cap of the handle of the tool of FIG. 1.

As shown in FIGS. 1 and 2, the tool for extracting broken endodontic instrument, designated generally as 20 in the drawings, has a cylindrical, tubular body 22. The body 22 has a cap 24 at one end on the body 22 that may be threaded onto the open end, or may form a snap fit onto the open end of the body 22. As shown in FIG. 3, the cap 24 has an LED indicator 26 that displays the power status of a battery stored in the body 22. For example, the LED indicator 26 may be a tricolor LED, emitting a green light when the battery is fully charged, a red light when battery voltage is too low to operate the heating or soldering gun, and yellow when the battery is approximately half-charged and needs charging. Alternatively, the LED may be a flashing LED, which may flash green when the soldering gun is not ready to be used and may stay solid green when the heating of soldering gun is ready for use. The cap 24 may house a pushbutton switch 25 for turning power to the heating or soldering gun on and off, the LED indicator being embedded in the switch 25.

Figure 4A:
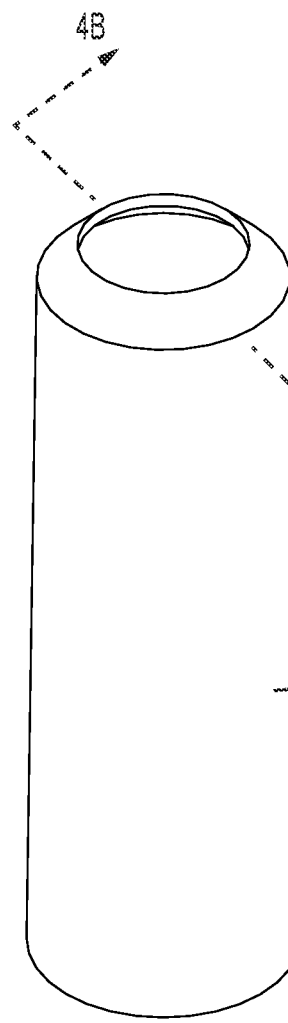
FIG. 4A is a perspective view of the external battery case portion of the handle of the tool for extracting broken endodontic instrument of FIG. 1.
Figure 4B:
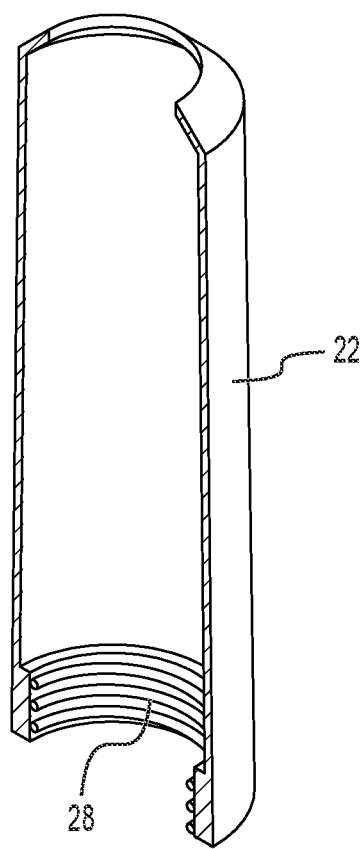
FIG. 4B is a section view taken along lines 4B-4B of FIG. 4A.
Figure 5A:
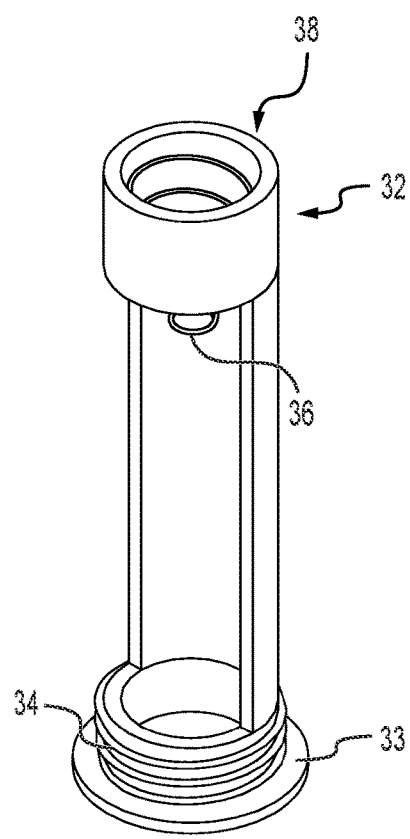
FIG. 5A is a perspective view of an exemplary battery holder of the tool for extracting broken endodontic instrument of FIG. 1.
Figure 5B:
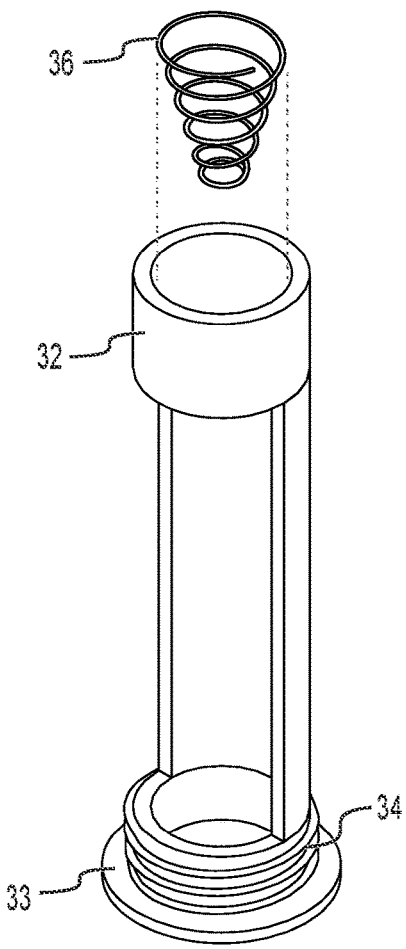
FIG. 5B is a partially exploded perspective view of the battery holder of FIG. 5A, showing the bias spring exploded from the holder.
Figure 6A:
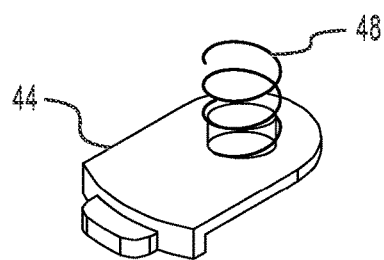
FIG. 6A is a perspective view of a control tab for controlling a solder refill container (solder magazine) of the tool for extracting broken endodontic instrument of FIG. 1.
Figure 6B:
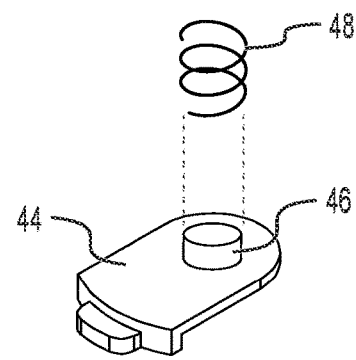
FIG. 6B is a partially exploded perspective view of the control tab of FIG. 6A, showing the bias spring exploded from the control tab.
Figure 7A:
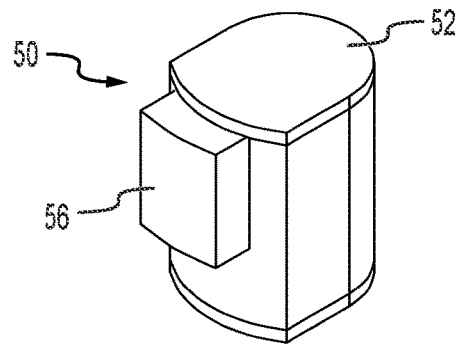
FIG. 7A is a perspective view of a solder refill container (solder magazine) of the tool for extracting broken endodontic instrument of FIG. 1.
Figure 7B:
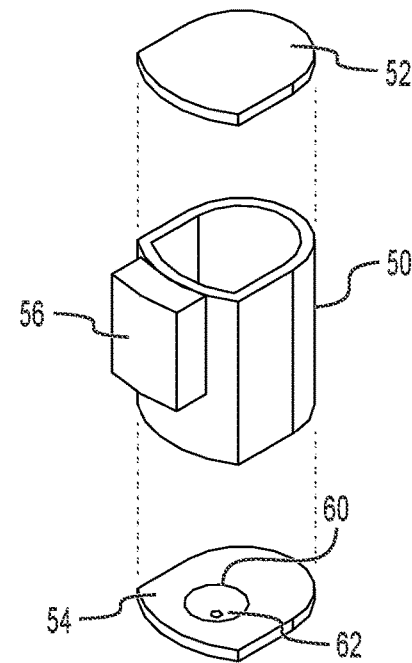
FIG. 7B is an exploded perspective view of the solder refill container (solder magazine) of FIG. 7A.

As shown in FIGS. 4A and 4B, the body 22 is cylindrical and tubular. The end 28 of the body 22 opposite the cap end is internally threaded. As shown in FIGS. 2, 5A, and 5B, the body 22 houses a battery holder 30 for holding a battery power supply having at least one rechargeable battery or batteries 32 of sufficient voltage to power the LED indicator 26 and the heating or soldering gun. A base end 33 of the battery holder 30 has external threads 34 for engaging the internally threaded end 28 of the body 22. A helical compression spring 36 is attached to the cap 24 and selectively engages a terminal end of the battery 32 through an open end 38 of the battery holder 30 when the pushbutton switch 25 is turned on to close the circuit and apply power to the LED indicator 26 and the heating or soldering gun. The spring 36 is retracted away from contact with the battery 32 when the pushbutton switch 25 is in the off position, leaving the circuit open.

As shown in FIGS. 1 and 2, the body 22 includes a cylindrical, tubular grip 40. The grip 40 has an outer surface having a high coefficient of friction, such as axial corrugations, a knurled surface, etc., so that the tool 20 can be firmly grasped to maneuver the tool 20 to secure the broken or separated endodontic instrument and extract the instrument from the root canal. The grip 40 has an open window 42 defined therein through which a solder magazine for the heating or soldering gun can be manipulated for securing the broken or separated endodontic instrument to tool 20 for extraction from the root canal. The grip 40 may be a cylindrical metal tube having a rubber sleeve resiliently disposed over the metal tube.

As shown in FIGS. 1, 2, 6A, and 6B, the magazine assembly includes a refill tab 44 that projects into or through the open window 42 in the grip 40. The refill tab 44 has a spring retainer lug 46 extending from one face thereof and a compression spring 48 attached to the lug 46. Normally, the spring 48 will be extended between the base end 33 of the battery holder 30 and the tab 44 to retain the magazine in the grip 40. However, the refill tab 44 my be pressed towards the battery holder 30 to compress the spring 48 and remove the magazine from the grip to refill the solder magazine with solder as needed.

As shown in FIGS. 2, 7A, 7B, 8A, and 8B, the magazine assembly includes a solder magazine 50 that is normally carried by a magazine carrier 70. The magazine 50 is a storage container having a removable top plate 52, a bottom plate 54, and a front face having a finger grip 56 projecting therefrom. When removed from the grip 40, the top plate 52 is lifted off the body of the magazine 50 so that the magazine 50 may be refilled with tiny balls or pellets of solder 58. The bottom plate 54 of the magazine 50 has a depression 60 formed therein having an eccentric release aperture 62 defined therein through which the balls or pellets of solder 58 may be released under user control one at a time.

Figure 8A:
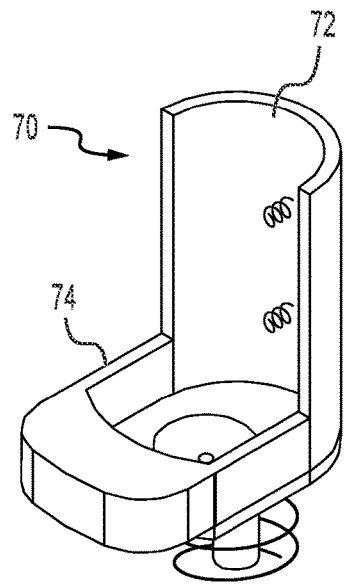
FIG. 8A is a perspective view of a solder dispenser of the tool for extracting broken endodontic instrument of FIG. 1.
Figure 8B:
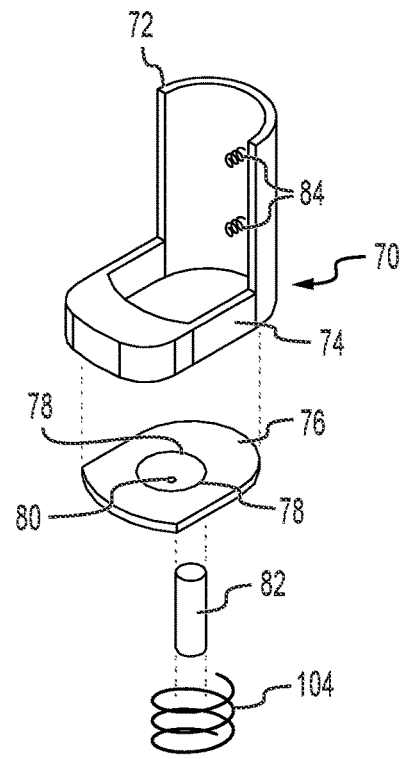
FIG. 8B is an exploded perspective view of the solder dispenser of FIG. 8A.

As shown in FIGS. 8A and 8B, the magazine carrier 70 has a tall, arcuate rear wall 72 and short, peripheral front and side retainer walls 74 dimensioned and configured for keeping the magazine 50 standing upright with the finger grip 56 projecting through the open window 42 of the grip 40. The carrier 70 has a bottom wall 76 having a depression 78 formed therein, the depression 78 having a release aperture 80 defined therein through which the balls or pellets of solder 58 may be released under user control one at a time. A tube or conduit 82 aligned with the aperture 80 extends downward for connection to the heating element of the heating or soldering gun. A pair of vertically or axially aligned compression springs 84 extend laterally forward from the rear wall 72 of the magazine carrier 70. The laterally extending compression springs 84 serve to bias the magazine 50 slightly forward, keeping the release apertures 62 and 80 misaligned to prevent the balls or pellets of solder 58 from dropping down into the heating element. When it is desired to operate the heating or soldering gun, the user can push the finger grip 56 of the magazine 50 rearward, moving the magazine rearward against the bias of the laterally extending compression springs 84 to align the release aperture 62 of the magazine 50 with the release aperture 80 of the magazine carrier 70 to release a single ball or pellet of solder 58 at a time to the heating element.

Figure 9:
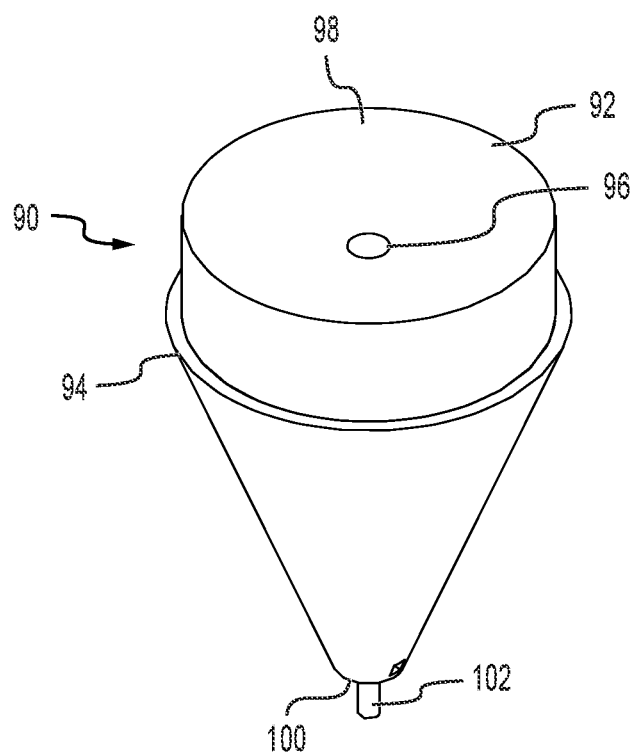
FIG. 9 is a perspective view of the conical nose of the tool for extracting broken endodontic instrument of FIG. 1.
Figure 10:
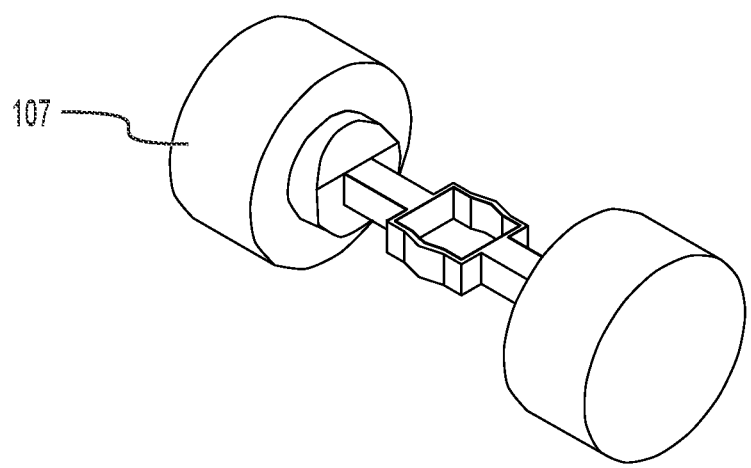
FIG. 10 is a perspective view of a lock member for locking the gripper tube to the conical nose of the tool for extracting broken endodontic instrument of FIG. 1.

As shown in FIGS. 2 and 9, the tool 20 has a conical nose 90 extending from the grip 40. The conical nose 90 includes a conical heating element 92 coated with or surrounded by a layer of thermal insulation 94, which may be, for example, polyvinylidene fluoride. The thermal insulation 94 may protect the user's fingers and the patient's mouth and tooth from the heat generated in the heating element 92 when melting the solder. The conical heating element 92 has a bore 96 defined therein extending from the base end 98 through the conical tip end 100. A nozzle 102 extends from the conical tip end 100 of the bore 96 for insertion into the open proximal end of a gripper tube. As shown in FIG. 8B, a compression spring 104 is concentrically disposed around the conduit 82 extending between the magazine carrier 70 and the heating element 92 and biases the carrier 70 away from the heating element 92 when pressure is released after dropping a ball of solder 58 into the bore 96 of the heating element 92.

Figure 11A:
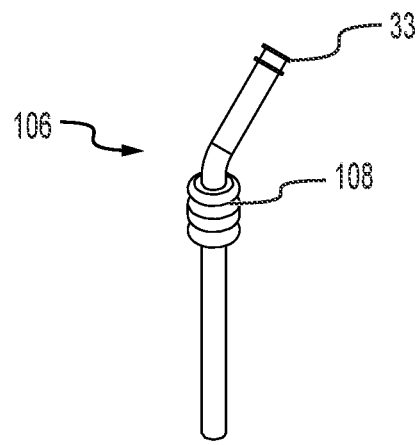
FIG. 11A is a front view of a gripper tube of the tool for extracting broken endodontic instrument of FIG. 1.
Figure 11B:
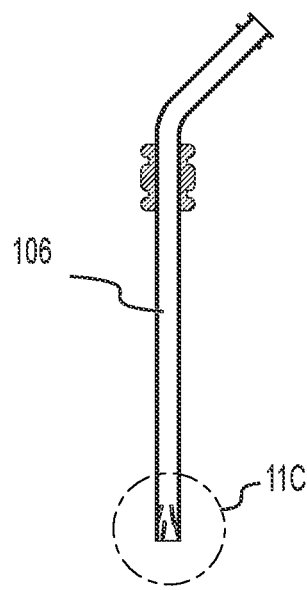
FIG. 11B is a side view in section of the gripper tube of FIG. 11A.
Figure 11C:
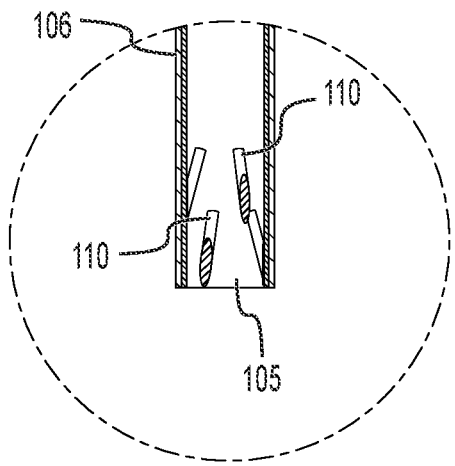
FIG. 11C is a detail view of area 11C of FIG. 11B.
Figure 11D:
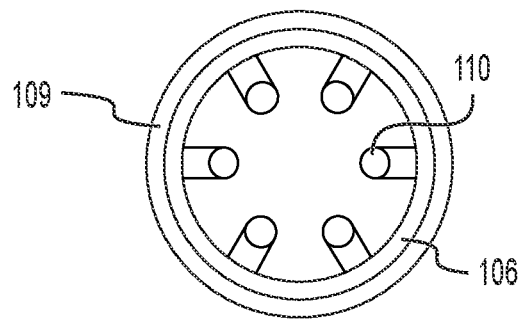
FIG. 11D is a top view of the gripper end of the gripper tube of FIG. 11A.

As shown in FIGS. 2 and 11A-11D, the tool 20 has a disposable gripper tube 106 removably attached to the conical nose 90. A clamp 107, shown in FIGS. 1, 2, 10, and 13, is slidably disposed at the conical tip end of the conical nose 90. The gripper tube 106 is slidably disposed over the nozzle 102. The clamp 107 is pushed forward to lock the gripper tube 106 to the nozzle 102, and retracted to release the gripper tube 106 from the conical nose 90. The gripper tube 106 is bent at an acute angle adjacent the end attached to the conical nose 90 so that the broken endodontic instrument does not extend too far into the gripper tube 106 and for ease in manipulating the tool 20 to capture the broken instrument. The gripper tube 106 may be furnished in several different diameters (at least three) to accommodate endodontic files, reamers, etc. of different diameter. The gripper tube 106 has two annular rings 108 just below the acute angle bend, which may be color-coded to provide a quick visual indicator of the size of the gripper tube 106. As shown in FIGS. 11B, 11C, and 11D, the open end 105 of the gripper tube 106 has at least two vertically spaced rows of gripper prongs 110 inside the tube 106 for mechanically gripping the broken or separated endodontic instrument. As with the conical nose 90, the gripper tube 106 may be coated with a layer of thermal insulation 109 (e.g., polyvinylidene fluoride) to protect the patient's mouth from excessive heat during soldering operations.

Figure 12A:
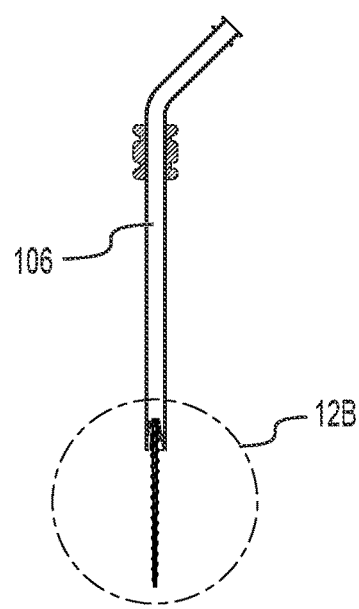
FIG. 12A is a partial environmental perspective view in section of the gripper tube of the tool for extracting broken endodontic instrument of FIG. 1 gripping a broken endodontic file.
Figure 12B:
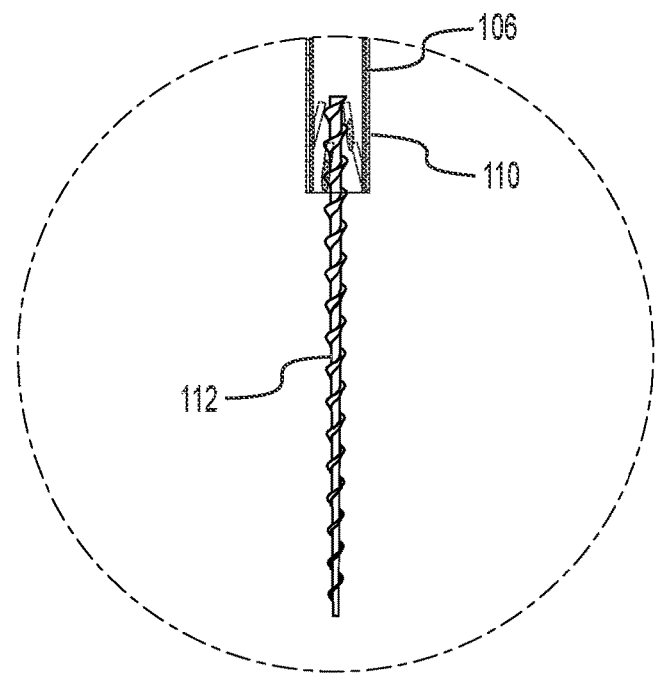
FIG. 12B is a detail view of area 12B of FIG. 12A.
Figure 12C:
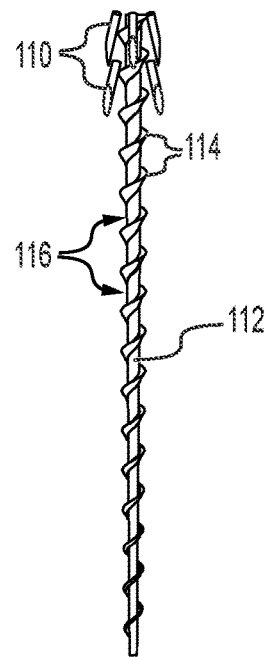
FIG. 12C is an environmental front view of gripper prongs engaging a broke endodontic file.
Figure 12D:
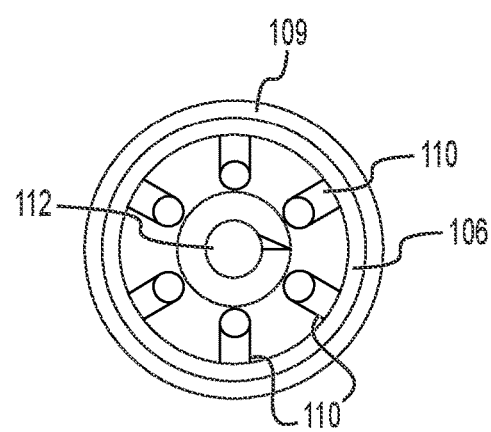
FIG. 12D is a schematic environmental top view in section of a gripper tube engaging a broken endodontic file.
Figure 13:
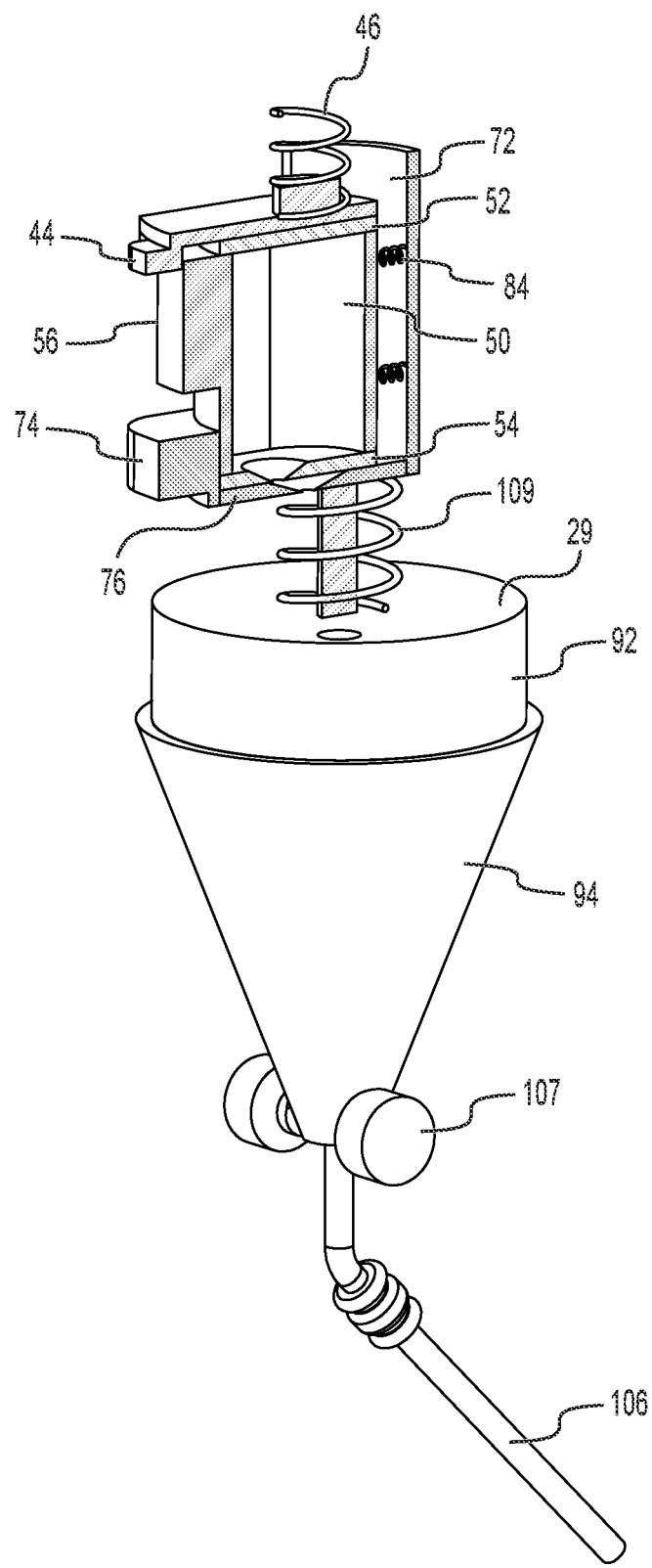
FIG. 13 is a partial exploded perspective view of the heating or solder gun magazine aligned above the heating element in the tool for extracting broken endodontic instrument of FIG. 1, the solder magazine and the magazine carrier being in section.

As shown most clearly in FIG. 12C, an endodontic file or reamer 112 is a thin, tapered wire having a spiral or helical cutting edge 114 winding down the working end of the instrument, defining flutes 116 between adjacent cutting edges 114. The gripping prongs 110 are each thin strips of metal resiliently attached to the interior wall of the gripper tube 106 and extending inward at an angle of about 45° relative to the interior wall of the gripper tube 106. Each row of prongs 110 includes three prongs equally spaced radially (about 120°) and the prongs 110 in the two rows are staggered, resulting in at least one prong 110 every 60° apart around the inner circumference of the open end of the gripper tube 106. In use, the open end of the gripper tube 106 is placed over the top end of the broken or separated endodontic instrument 112, as shown in FIG. 12A, and pushed down the instrument 112. The cutting edge 114 compresses the prongs 110 against the interior wall of the gripper tube 106 as they pass by, the prongs 110 resiliently expanding into the flute 116 below he cutting edge 114 to hook the cutting edge 114 from below, as seen in FIGS. 12B, 12C, and 12D. When the gripper tube 106 is pulled in the opposite direction, the prongs 110 remain hooked beneath the cutting edge 114, mechanically gripping the broken instrument 112 so that the broken file or reamer 112 may be extracted from the root canal.

In order to further secure the gripper tube's 106 grip on the separated endodontic instrument 112, each prong 110 and the interior wall of the gripper tube 106 is pretreated with a thin layer or coating of tin-lead (Sn–Pb) solder. The tin-lead solder has the lowest melting point (183° C. or 361° F.) of the various solder alloys. The solder balls 58 in the slodering gun magazine 50 are composed of tin (96.5%), silver (3.0%), and copper (0.5%), have a diameter of about 0.89 mm, and a melting temperature of 217° C. Once the gripper tube 106 has been inserted over the separated endodontic instrument 112 far enough to hook the two rows of gripper prongs 110 below the cutting edge 114, the user may push the magazine 50 against the magazine carrier 70 far enough to align the release apertures 62 and 80 to drop a ball of solder 58 into the heating element 92 (see FIG. 13) and turn the heating or soldering gun on using the pushbutton switch 25 to melt the ball of solder 58. The melted solder passes through the nozzle 102 and drains down to the prongs 110, the heat from the melted solder joining the pretreated prongs 110 to the broken instrument 112 to solder the two together, reinforcing the mechanical connection between the prongs 110 and the separated instruments 112. The soldering operation may be repeated as needed.

In use, other endodontic instruments may be used, e.g., to apply an ultrasonic tip to the area around the broken endodontic instrument to clean enough pulp or tissue away to expose the broken or separated instrument or to excavate the area enough to expose the broken or separated instrument. The tool 20 is then manipulated to place the gripper tube 106 over the separated instrument 112, hooking the prongs 110 under the cutting edge 114 and securing the attachment by soldering. The broken or separated instrument may then be extracted from the root canal, and the gripper tube 106 with the endodontic instrument attached thereto may be removed from the tool 20 and disposed of.

It is to be understood that the tool for extracting broken endodontic instrument is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A tool for extracting broken endodontic instrument, comprising:

a tubular, cylindrical body having opposing ends;

a grip extending from one of the ends of the body;

a conical nose extending from the grip; and a disposable gripper tube releasably attached to the conical nose, the gripper tube having an open gripping end dimensioned and configured for slidable insertion over an end of the broken endodontic instrument, the gripper tube having a plurality of resilient gripping prongs circumferentially disposed inside the open gripping end, the gripping prongs being compressible to permit passage of the broken endodontic instrument into the open gripping end of the gripper tube and resiliently biased to expand and hook under a spiral cutting edge of the broken endodontic instrument, thereby mechanically gripping the broken endodontic instrument for extraction from a patient's mouth a battery power supply housed within said body;

a magazine of solder pellets housed within said grip;

a heating element for melting the solder pellets one at a time, the heating element being disposed in the conical nose;

a cap housing an electrical switch, the cap closing the end of said body opposite said grip, the electrical switch being connected to the battery power supply;

a nozzle extending between the heating element and said gripper tube; and selectively alignable apertures and bores defined in the magazine and the heating element so that a user may selectively dispense a pellet of solder from the magazine into the heating element and turn the electrical switch on to melt the pellet of solder in the heating element, the melted solder passing through the nozzle to the gripper prongs in said gripper tube to form a solder joint between said gripper tube and the broken endodontic instrument, further securing attachment of the broken endodontic instrument to said gripper tube.

2. The tool for extracting broken endodontic instrument according to claim 1, wherein said plurality of gripper prongs comprises:
a first row of three gripper prongs radially spaced 120° apart;
a second row of three gripper prongs axially spaced from the first row, the three gripper prongs of the second row being radially spaced 120° apart and radially spaced between the gripper prongs of the first row to provide gripper prongs radially spaced 60° apart within said gripper tube.

3. The tool for extracting broken endodontic instrument according to claim 1, wherein said grip comprises a metal tube having a resilient rubber sleeve disposed over the metal tube, the rubber sleeve having an outer surface having a grip-enhancing pattern defined therein.

4. The tool for extracting broken endodontic instrument according to claim 1, wherein said grip has an open window defined therein, the tool further comprising:
a refill tab disposed between the magazine and the power supply, the refill tab having a bias spring attached thereto bearing against the battery supply to bias the magazine partially below the open window, the refill tab having a portion extending through the open window;
whereby the refill tab may be raised to compress the bias spring to remove the magazine for refilling the magazine with solder pellets.

5. The tool for extracting broken endodontic instrument according to claim 4, wherein said magazine has a bottom wall having a magazine release aperture defined therein, the tool further comprising a magazine carrier having a bottom wall, a rear wall and a retainer wall retaining the magazine on the magazine bottom wall, the bottom wall of the magazine carrier having a second release aperture defined herein, the rear wall having axially spaced bias springs extending laterally above the bottom wall of the magazine carrier, the bias springs maintaining the release aperture in the bottom wall of said magazine out of alignment with the second release aperture in the bottom wall of the magazine carrier until a user selectively reaches through the open window in said grip and pushes said magazine against the rear wall of the magazine carrier to compress the bias springs and align the release apertures to selectively release a pellet of solder through the aligned release apertures.

6. A tool for extracting broken endodontic instrument, comprising:
a tubular, cylindrical body having opposing ends;
a grip extending from one of the ends of the body;
a conical nose extending from the grip;
a disposable gripper tube releasably attached to the conical nose, the gripper tube having an open gripping end dimensioned and configured for slidable insertion over an end of the broken endodontic instrument, the gripper tube having a plurality of resilient gripping prongs circumferentially disposed inside the open gripping end, the gripping prongs being compressible to permit passage of the broken endodontic instrument into the open gripping end of the gripper tube and resiliently biased to expand and bear against the broken endodontic instrument;
a battery power supply housed within the body;
a magazine of solder pellets housed within the grip;
a heating element for melting the solder pellets one at a time, the heating element being disposed in the conical nose;
a cap housing an electrical switch, the cap closing the end of the body opposite the grip, the electrical switch being connected to the battery power supply;
a nozzle extending between the heating element and the gripper tube; and
selectively alignable apertures and bores defined in the magazine and the heating element so that a user may selectively dispense a pellet of solder from the magazine into the heating element and turn the electrical switch on to melt the pellet of solder in the heating element, the melted solder passing through the nozzle to the gripper prongs in the gripper tube to form a solder joint between the gripper tube and the broken endodontic instrument, thereby gripping the broken endodontic instrument for extraction from a patient's mouth.

7. The tool for extracting broken endodontic instrument according to claim 6, wherein:
the broken endodontic instrument is a thin tapered wire having a spiral cutting edge defining flutes between adjacent portions of the cutting edge; and
said gripping prongs are resiliently biased to expand and hook under the spiral cutting edge of the broken endodontic instrument, thereby mechanically gripping the broken endodontic instrument prior to forming the solder joint, further securing attachment of the broken endodontic instrument to said gripper tube.

8. The tool for extracting broken endodontic instrument according to claim 6, wherein said plurality of gripper prongs comprises:
a first row of three gripper prongs radially spaced 120° apart;
a second row of three gripper prongs axially spaced from the first row, the three gripper prongs of the second row being radially spaced 120° apart and radially spaced between the gripper prongs of the first row to provide gripper prongs radially spaced 60° apart within said gripper tube.

9. The tool for extracting broken endodontic instrument according to claim 6, wherein said grip comprises a metal tube having a resilient rubber sleeve disposed over the metal tube, the rubber sleeve having an outer surface having a grip-enhancing pattern defined therein.

10. The tool for extracting broken endodontic instrument according to claim 6, wherein said grip has an open window defined therein, the tool further comprising:
a refill tab disposed between the magazine and the power supply, the refill tab having a bias spring attached thereto bearing against the battery supply to bias the magazine partially below the open window, the refill tab having a portion extending through the open window;
whereby the refill tab may be raised to compress the bias spring to remove the magazine for refilling the magazine with solder pellets.

11. The tool for extracting broken endodontic instrument according to claim 10, wherein said magazine has a bottom wall having a magazine release aperture defined therein, the tool further comprising a magazine carrier having a bottom wall, a rear wall and a retainer wall retaining the magazine on the magazine bottom wall, the bottom wall of the magazine carrier having a second release aperture defined herein, the rear wall having axially spaced bias springs extending laterally above the bottom wall of the magazine carrier, the bias springs maintaining the release aperture in the bottom wall of said magazine out of alignment with the second release aperture in the bottom wall of the magazine carrier until a user selectively reaches through the open window in said grip and pushes said magazine against the rear wall of the magazine carrier to compress the bias springs and align the release apertures to selectively release a pellet of solder through the aligned release apertures.

12. A tool for extracting broken endodontic instrument, comprising:
   a tubular, cylindrical body having opposing ends;
   a grip extending from one of the ends of the body;
   a conical nose extending from the grip; and
   a disposable gripper tube releasably attached to the conical nose, the gripper tube having an open gripping end dimensioned and configured for slidable insertion over an end of the broken endodontic instrument, the gripper tube having a plurality of resilient gripping prongs circumferentially disposed inside the open gripping end, the gripping prongs being compressible to permit passage of the broken endodontic instrument into the open gripping end of the gripper tube and resiliently biased to expand and hook under a spiral cutting edge of the broken endodontic instrument;
   a battery power supply housed within the body;
   a magazine of solder pellets housed within the grip;
   a heating element for melting the solder pellets one at a time, the heating element being disposed in the conical nose;
   a cap housing an electrical switch, the cap closing the end of the body opposite the grip, the electrical switch being connected to the battery power supply;
   a nozzle extending between the heating element and the gripper tube; and
   selectively alignable apertures and bores defined in the magazine and the heating element so that a user may selectively dispense a pellet of solder from the magazine into the heating element and turn the electrical switch on to melt the pellet of solder in the heating element, the melted solder passing through the nozzle to the gripper prongs in the gripper tube to form a solder joint between the gripper tube and the broken endodontic instrument, further securing attachment of the broken endodontic instrument to the gripper tube for extraction of the broken endodontic instrument from a patient's mouth.

13. The tool for extracting broken endodontic instrument according to claim 12, wherein said plurality of gripper prongs comprises:
   a first row of three gripper prongs radially spaced 120° apart;
   a second row of three gripper prongs axially spaced from the first row, the three gripper prongs of the second row being radially spaced 120° apart and radially spaced between the gripper prongs of the first row to provide gripper prongs radially spaced 60° apart within said gripper tube.

14. The tool for extracting broken endodontic instrument according to claim 12, wherein said grip comprises a metal tube having a resilient rubber sleeve disposed over the metal tube, the rubber sleeve having an outer surface having a grip-enhancing pattern defined therein.

15. The tool for extracting broken endodontic instrument according to claim 12, wherein said grip has an open window defined therein, the tool further comprising:
   a refill tab disposed between the magazine and the power supply, the refill tab having a bias spring attached thereto bearing against the battery supply to bias the magazine partially below the open window, the refill tab having a portion extending through the open window;
   whereby the refill tab may be raised to compress the bias spring to remove the magazine for refilling the magazine with solder pellets.

16. The tool for extracting broken endodontic instrument according to claim 15, wherein said magazine has a bottom wall having a magazine release aperture defined therein, the tool further comprising a magazine carrier having a bottom wall, a rear wall and a retainer wall retaining the magazine on the magazine bottom wall, the bottom wall of the magazine carrier having a second release aperture defined herein, the rear wall having axially spaced bias springs extending laterally above the bottom wall of the magazine carrier, the bias springs maintaining the release aperture in the bottom wall of said magazine out of alignment with the second release aperture in the bottom wall of the magazine carrier until a user selectively reaches through the open window in said grip and pushes said magazine against the rear wall of the magazine carrier to compress the bias springs and align the release apertures to selectively release a pellet of solder through the aligned release apertures.

17. The tool for extracting broken endodontic instrument according to claim 12, wherein said conical nose and said gripper tube each further comprise a layer of polyvinylidine fluoride thermal insulation for protection of the patient's mouth from heat generated during soldering.

\* \* \* \* \*